(12) United States Patent
Benini et al.

(10) Patent No.: US 6,666,582 B2
(45) Date of Patent: Dec. 23, 2003

(54) SIAMESE BOLT HOLES IN POWDER METAL COMPONENTS

(75) Inventors: James M. Benini, Kersey, PA (US); Jude D. Schlimm, Kersey, PA (US); Ralph E. Mc Kimm, Sr., Emporium, PA (US)

(73) Assignee: GKN Sinter Metals, Inc., Germantown, WI (US)

( * ) Notice: Subject to any disclaimer, the term of this patent is extended or adjusted under 35 U.S.C. 154(b) by 0 days.

(21) Appl. No.: 10/168,750
(22) PCT Filed: Jan. 3, 2001
(86) PCT No.: PCT/US01/00102
§ 371 (c)(1), (2), (4) Date: Jun. 24, 2002
(87) PCT Pub. No.: WO01/50031
PCT Pub. Date: Jul. 12, 2001

(65) Prior Publication Data
US 2002/0191875 A1 Dec. 19, 2002

Related U.S. Application Data
(60) Provisional application No. 60/174,218, filed on Jan. 3, 2000.

(51) Int. Cl.$^7$ ................................................ F16C 17/02
(52) U.S. Cl. ...................................... 384/433; 384/434
(58) Field of Search ................................. 384/434, 433, 384/432, 294, 288

(56) References Cited

U.S. PATENT DOCUMENTS

| 5,536,089 | A | 7/1996 | Weber et al. ................ 384/294 |
| 5,775,817 | A | 7/1998 | Gottemoller et al. ........ 384/434 |
| 6,280,091 | B1 * | 8/2001 | Martin et al. ................ 384/296 |
| 6,422,755 | B1 * | 7/2002 | Cadle et al. ................. 384/433 |

* cited by examiner

Primary Examiner—Lenard A. Footland
(74) Attorney, Agent, or Firm—Quarles & Brady LLP

(57) ABSTRACT

A main bearing cap (20) has an hourglass shaped slot (22) in each leg (14).

4 Claims, 3 Drawing Sheets

SIAMESE BOLT HOLES IN POWDER METAL COMPONENTS

CROSS-REFERENCE TO RELATED APPLICATIONS

This claims the benefit of U.S. Provisional Patent Application No. 60/174,218 filed Jan. 3, 2000.

STATEMENT REGARDING FEDERALLY SPONSORED RESEARCH OR DEVELOPMENT

Not applicable.

BACKGROUND OF THE INVENTION

1. Field of the Invention

This invention relates to powder metal component parts, and in particular to a powder metal main bearing cap that reduces the total weight of an internal combustion engine or similar device.

2. Discussion of the Prior Art

There is a continual pressure to reduce vehicular weight in order to improve fuel efficiency and to conserve the world's finite oil resources. Major advances have been made in this direction, including changing the engine cylinder block from cast iron to aluminum. Attention has turned to all the smaller incremental weight savings that are possible on every single component used in the engine.

It is necessary to retain an iron based (steel or cast iron) material for the main bearing cap that retains the crankshaft in its position at the lower end of the cylinder block. The iron base is needed since it has a matching thermal expansion rate with the crankshaft material, which is commonly either ductile cast iron or forged steel. In this way, as the engine temperature rises in service, the two components (bearing cap and crankshaft journal diameter) expand at the same rate, thereby maintaining constant running clearances at the bearing surfaces. However, since iron or steel is much more dense (about 300%) than aluminum, weight reduction of the iron based bearing cap is a prime target for weight reduction, especially since there are commonly 4 or 5 caps per engine.

It is known to make main bearing caps by the manufacturing process known as powder metallurgy. See, for example, International Patent Publication No. WO 97/42424. This process involves compaction of fine metallic and non-metallic powder blends in precision tooling that generate a precise powder preform or compact. This compact has low strength at this stage, only sufficient for handling without breaking as it is loaded onto a carrier plate that transports it through a thermal treatment furnace. This thermal treatment is known as "sintering", and causes the powder particles to inter-diffuse and bond together to form a strong "sintered" component that has many functional engineering uses. There are many publications that explain the powder metallurgy (P/M) process in depth and practitioners of the art are knowledgeable in this process.

Although main bearing caps come in many different shapes, sizes and geometries, a main bearing cap 2 is typified by the design shown in FIG. 1. This consists of an essentially rectangular slab standing upon its long surface, with a half-circular section cut out from the lower side to create semi-circular surface 4 and legs 14 on each side of the surface 4. This form then has the general appearance of a "bridge". The underbridge semi-circular surface 4 forms the lower half of a round bore when it is inverted and bolted to a mating semi-circular cut-out in the cylinder block. When the bearing caps are bolted to the cylinder block, they form the round-bore that holds the bearing shells that in turn hold the crankshaft in place. During the power stroke of the engine, a great load is placed upon the bearing caps that tries to separate the bearing caps from the cylinder block. The resistance to separation is provided by the main bearing bolts that clamp the cap to the cylinder block. As engine power has increased and cylinder block stiffness has decreased (aluminum is less stiff than cast iron), it has become the norm to use four main bolts, two through holes 6, 8 on each side of the bore which extend all of the way through the legs 14. Two more bolts are commonly provided at the outside ends of the cap, into blind tapped holes 10 formed in wings 15 (hole 10 in right wing 15 is present but not shown), to further stiffen the assembly (see FIG. 1).

SUMMARY OF THE INVENTION

The invention provides a design feature in a sintered powder metal main bearing cap, such as those used in combustion engines or similar reciprocating mechanical devices, which features a weight saving specially shaped slot between adjacent bolt holes on each side of the bearing arch. The connecting slot may extend the full length of the bolt holes, or for only the lower portion of the height, leaving a partial bridge to optimize under-bolt head clamping pressure. In addition, the outer profile of the bearing cap that surrounds the connected holes mimics the "hourglass" shape so as to keep a uniform wall thickness around the slot region. The precise shape and size of the slot is calculated to ensure that the two bolts are guided into their respective tapped holes by the narrowing of the slot in an "hourglass" shape that also maximizes the weight reduction from the metal removed by the slot form. The design and use of an hourglass shape section core-rod to form the connected holes is also an advantage during powder compaction.

DETAILED DESCRIPTION OF THE INVENTION

This invention teaches a main bearing cap design that addresses these concerns, but in addition removes material from between the two sets of main bearing bolts. The bearing cap is made from an iron-copper-phosphorus alloy steel manufactured by powder metallurgy.

Figure 2:
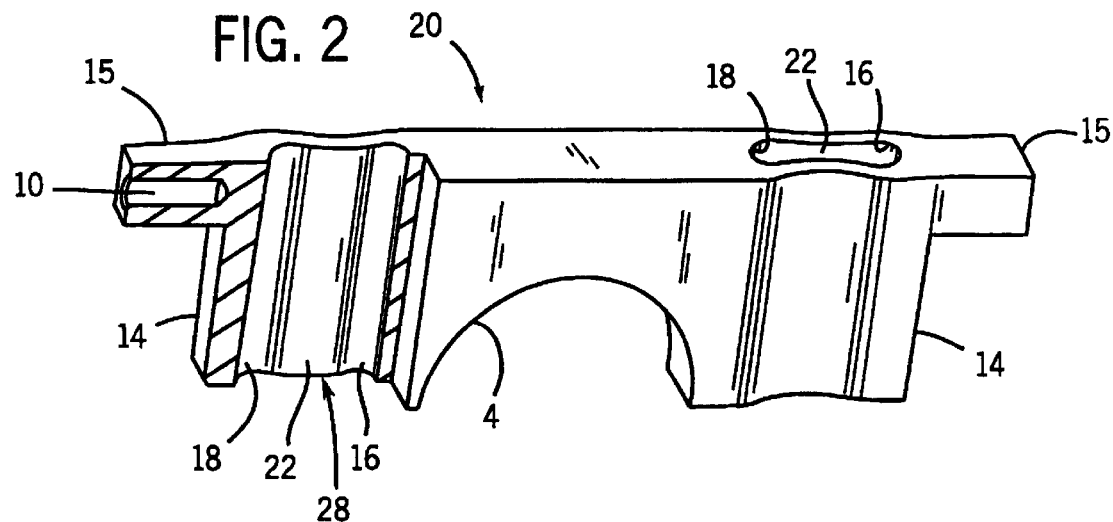
FIG. 2 is a perspective view like FIG. 1 of a main bearing cap incorporating the invention.

In the first embodiment of the invention illustrated in FIG. 2, main bearing cap 20 has two bolt holes 16, 18 at each end which are co-joined by a connecting slot 22 between them (FIG. 2), to make an hourglass shaped hole that accommodate both bolts, one at each end. The shape of the slot is important to the installation stage of engine build, which is usually automated. Since the two bolts must fit into two respective tapped holes in the cylinder block, the bolt holes must guide them into these holes. A full width slot would not satisfy this function as the bolts could move towards each other and miss their respective holes. Therefore, the overall slot 28 must be shaped like an hourglass, with the ends 16, 18 round and slightly larger in diameter than the bolts and the connecting slot 22 smaller in width than the bolt diameter where the slot joins the holes, to ensure that the bolts still find their respective threaded holes during installation.

Since bolt sizes and hole clearances vary from engine to engine, a single design can not be specified. However, the limiting "hourglass" geometry of the slot to maximize weight reduction yet provide bolt guidance is an exercise in three-dimensional geometry that persons of ordinary skill in the art can readily accomplish.

Figure 3:
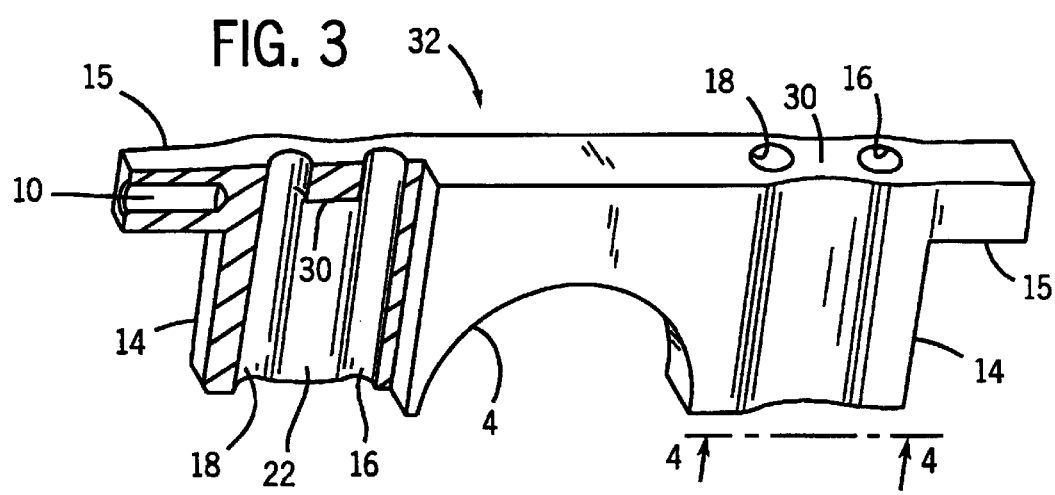
FIG. 3 is a perspective view like FIG. 2 of a second embodiment of a main bearing cap of the invention.

A concern with a slot 22 which extends for the full length of the legs 14 is that it reduces the clamping area under the bolt heads. This may produce excessive localized stresses in the region around the slot that is in contact with the bolt head. The bolt head clamping loads can total 20 tons on a typical vehicular bearing cap. To avoid an excessive pressure which may be caused by a full length slot 22, FIG. 3 shows a second embodiment 32 in which slot 22 stops short of the top of the bearing cap 32 and a partial bridge 30 is left in place when the between-bolt slot 22 is formed. This small residual bridge 22 satisfies the under bolt head pressure concern and only marginally reduces the weight savings.

Figure 5:
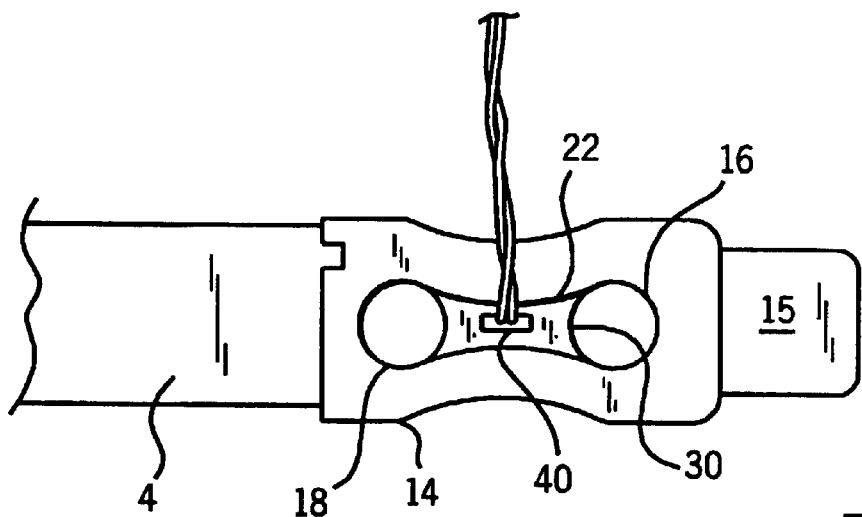
FIG. 5 is a view like FIG. 4, illustrating a strain gage on the underside of the slot bridge.
Figure 6:
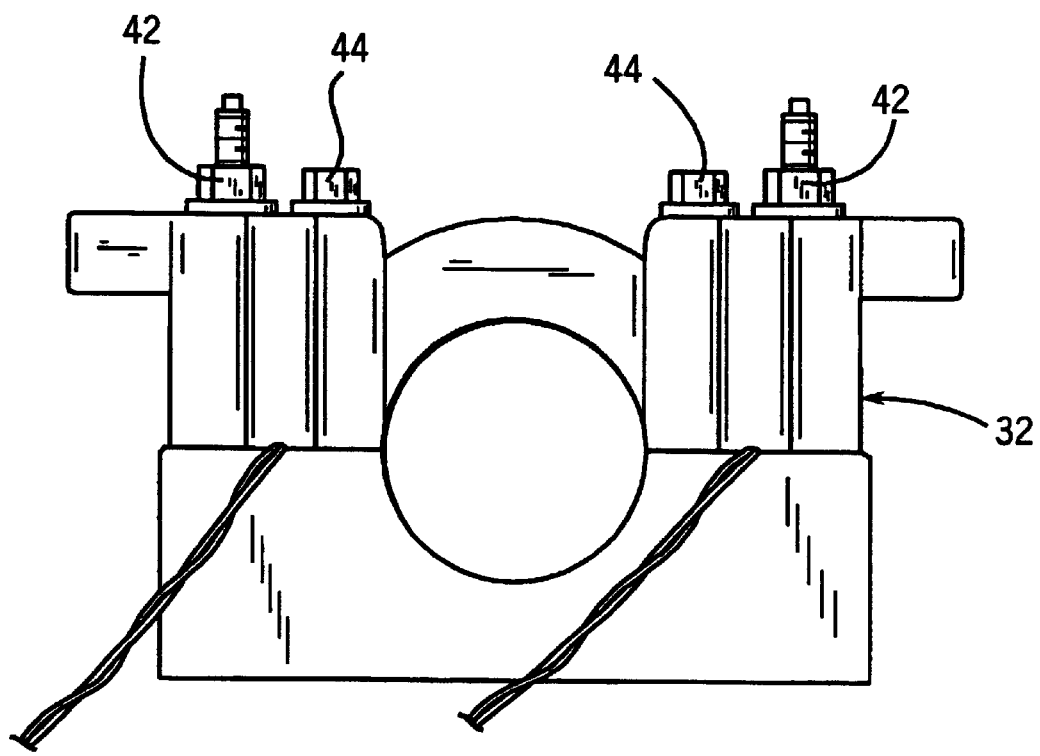
FIG. 6 is a side view of the bearing cap of FIGS. 3–5, fitted with a strain gage on the underside of the slot bridge at each end and installed on a test fixture.

An initial test was carried out to confirm that the design of the invention is sound. This test involved attaching a strain gage 40 to the underside of the slot bridge in a powder metal main bearing cap as illustrated in FIG. 5. Next the cap was fitted and bolted into a test fixture that simulates the engine block using bolts 42, 44 and torque procedures specified by the engine manufacturer as illustrated in FIG. 6. The leads of the gage were passed through a channel cut into the test block. The maximum strain caused by this fitting and bolting was measured and converted to a stress value using well known calculations that involve the bearing cap material elastic modulus, which in this example is 17.5 million psi. The resulting stresses from this test are between three and five thousand psi. This clearly indicates that the design is sound, since the stress is well below both the static strength (70 ksi) and the fatigue strength (26 ksi) of the chosen powder metal material which was a copper phosphorus steel at a density of 6.5 to 6.7 g/cc.

Figure 4:
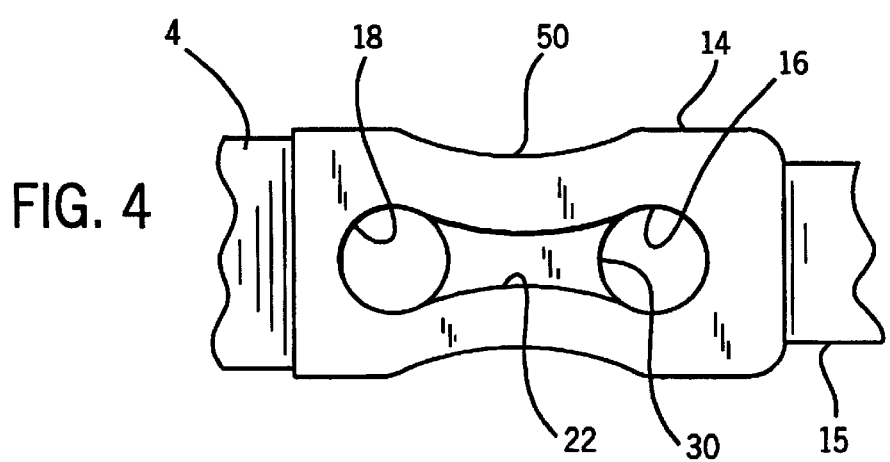
FIG. 4 is a fragmentary plan view from the plane of the line 4—4 of FIG. 3.

In the embodiment 32 of FIG. 3, the savings of weight of the engine totaled 300 grams or 0.66 lbs. weight. This is a significant value, especially since when it is coupled with the "hourglass" outer profile 50, best shown in FIGS. 4 and 5, that mimics the siamese shaped slot to maintain a uniform wall thickness. As shown in FIGS. 4 and 5, the outer width of the profile 50 thins down in the length between the holes 16, 18, so as to maintain a relatively constant wall thickness for the legs 14. Thus, in the embodiment of FIGS. 3–5, the weight reduction is increased to 590 grams (1.30 lbs.), a 9.6% weight savings.

Figure 1:
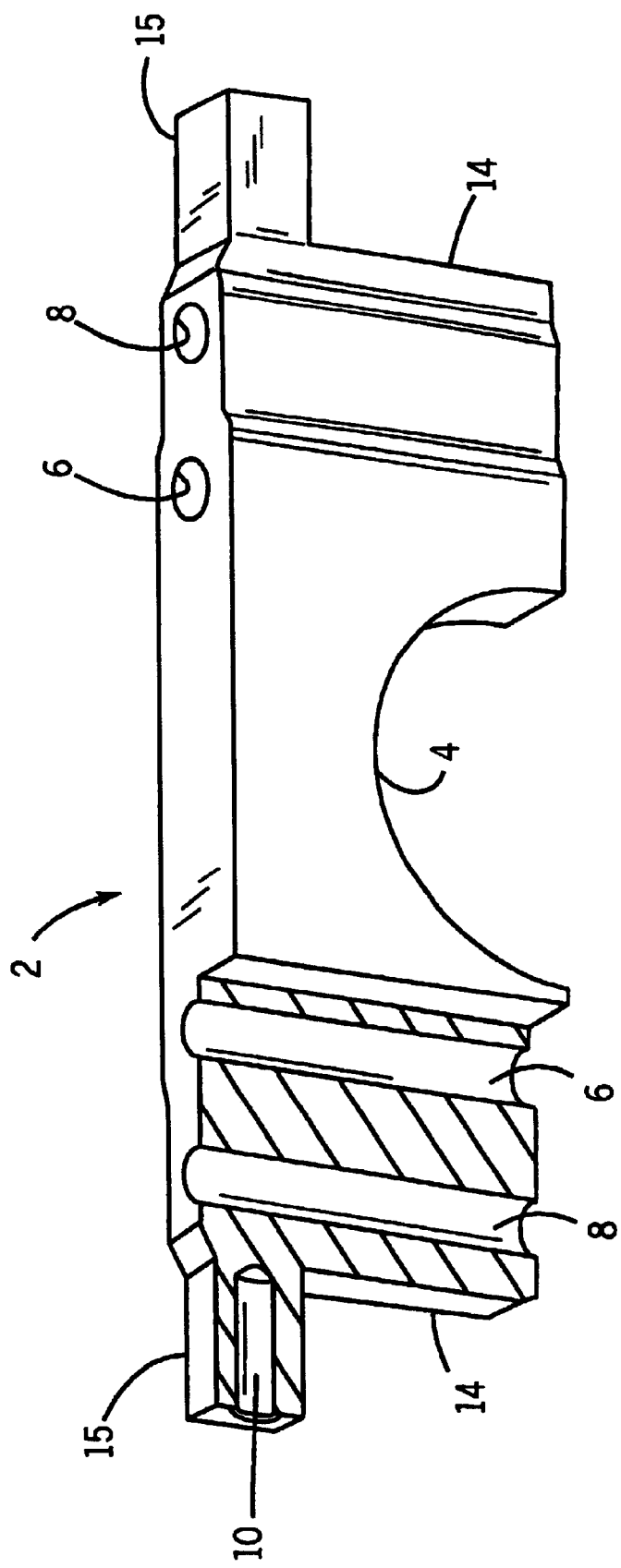
FIG. 1 is a perspective view partially in section of a typical prior art main bearing cap.

Powder metallurgy is particularly well suited to making main bearing caps with the relatively complex slot shapes as illustrated in FIG. 2 or FIGS. 3–6, since these shapes are formed with a core rod in the shape of the slot. An added benefit of the connected bolt-holes design relates to these core rods. In a separate holes design (FIG. 1), the core rods are two rods to form the individual holes. These core-rods are thin and long, and suffer from a tendency to bend and break under the high pressure used to compact the powders. The joining together of the bolt-holes results in a much stronger core rod and a reduced tendency to bend and break.

Preferred embodiments of the invention have been described in considerable detail. Many modifications and variations will be apparent to persons of ordinary skill in the art. Therefore, the invention should not be limited to the embodiments described.

We claim:

1. In a main bearing cap which has a half bore formed in it and a pair of legs, each said leg being on opposite sides of the half-bore and each said leg being boltable by two bolts to a supporting structure so as to secure said bearing cap to said supporting structure so that said half-bore of said bearing cap mates with a half bore in said supporting structure to form a fill bore, the improvement wherein said main bearing cap is powder metal and each said leg has formed in it an hourglass shaped slot having opposite ends enlarged relative to an open central section which connects said two ends, each said end being sized to receive one of said two bolts and said central section being sized so as to be smaller in width than said end sections so that said end sections guide said bolts as they are inserted through said legs.

2. The improvement of claim 1, wherein said hourglass shaped slot ends below an upper surface of said main bearing cap, and through holes are provided in said upper surface which are aligned with the ends of said slot so as to provide a bridge of material between said holes under heads of said bolts.

3. The improvement of claim 1, wherein the exterior sides of each leg are also hourglass shaped to provide an approximately uniform wall thickness between at least portions of said exterior sides and said hourglass shaped slot.

4. The improvement of claim 1, wherein each said slot is formed by a single core rod during compaction of said main bearing cap.

* * * * *

UNITED STATES PATENT AND TRADEMARK OFFICE
CERTIFICATE OF CORRECTION

PATENT NO.   : 6,666,582 B2 Page 1 of 1
DATED        : December 23, 2003
INVENTOR(S)  : J. Benini et al.

It is certified that error appears in the above-identified patent and that said Letters Patent is hereby corrected as shown below:

Column 4,
Line 28, replace "fill" with -- full --.

Signed and Sealed this

Twenty-seventh Day of July, 2004

JON W. DUDAS
*Acting Director of the United States Patent and Trademark Office*